Feb. 19, 1957 J. THEVENIEAU 2,781,892
PROJECTION MACHINES FOR LOOSE MATERIAL
Filed Dec. 2, 1953 3 Sheets-Sheet 1

INVENTOR
JEAN THEVENIEAU

BY
*Adams & Bush*
ATTORNEYS

Feb. 19, 1957  J. THEVENIEAU  2,781,892
PROJECTION MACHINES FOR LOOSE MATERIAL
Filed Dec. 2, 1953  3 Sheets-Sheet 2

INVENTOR
JEAN THEVENIEAU

BY
*Adams + Bush*
ATTORNEYS

Feb. 19, 1957 J. THEVENIEAU 2,781,892
PROJECTION MACHINES FOR LOOSE MATERIAL
Filed Dec. 2, 1953 3 Sheets-Sheet 3

INVENTOR
JEAN THEVENIEAU

BY
*Adams & Bush*
ATTORNEYS

United States Patent Office 2,781,892
Patented Feb. 19, 1957

2,781,892

PROJECTION MACHINES FOR LOOSE MATERIAL

Jean Thevenieau, Samois-sur-Seine, France, assignor to Societe Preparation Industrielle des Combustibles, Fontainebleau, France, a French company Application December 2, 1953, Serial No. 395,685

Claims priority, application France December 3, 1952

5 Claims. (Cl. 198—128)

This invention relates to material handling apparatus and has more particular relation to apparatus for projecting solid loose material through various distances and to various heights.

One object of the present invention is to provide a novel and improved apparatus for projecting solid loose material through various distances and to various heights.

Another object of the present invention is to provide novel projection apparatus, as characterized above, wherein the projection is accomplished by an endless belt winding around two drums, the variation of the projection angle being obtained by deflecting the projecting belt to a suitable angle.

Another object of the present invention is to provide novel projection apparatus which is simple and rugged in construction and efficient in operation.

Other objects and advantages will appear in the following specification when considered in connection with the accompanying drawings, wherein.

In general, the present invention provides novel apparatus for projecting solid loose material through various distances and to various heights, and comprises an endless projection belt mounted on laterally spaced-apart drums; means for rotating the projection belt at high speed around the drums, so that the material will be projected in a direction perpendicular to the longitudinal axis of the drums; and means for varying the projection angle by deflecting the projecting belt to a suitable angle, so that the material projected will follow a predetermined trajectory. The distance and height of projection of the material vary with the belt speed and the projection angle which the upper surface of the top reach of the belt makes with the horizontal.

Figure 1:
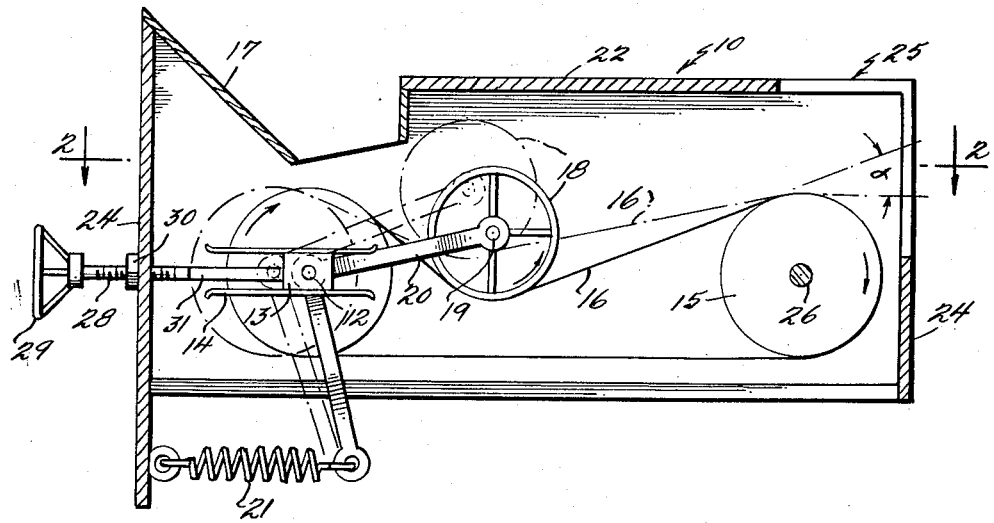
Fig. 1 is a longitudinal vertical sectional view, taken on the line 1—1 of Fig. 2, of one embodiment of apparatus constructed in accordance with the present invention, for projecting solid loose material.
Figure 2:
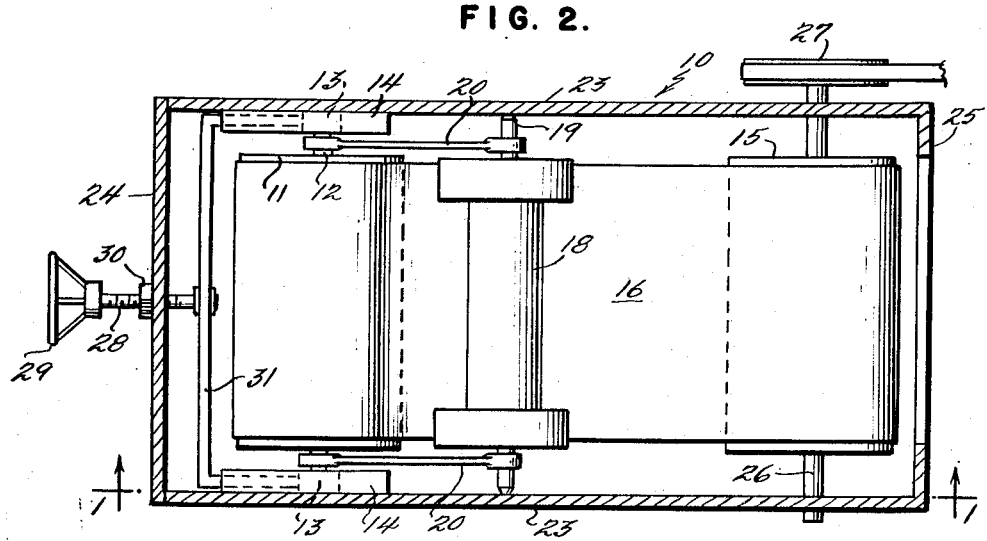
Fig. 2 is a horizontal sectional view taken on the line 2—2 of the apparatus shown in Fig. 1.

Referring now to the drawings, there is shown, in Figs. 1 and 2, one embodiment of apparatus constructed in accordance with the present invention. As there shown, the apparatus comprises a frame or housing 10; an idle roller or drum 11 loosely mounted on a rotatable shaft 12 having its ends journalled in bearing blocks 13, each slidably mounted in a slide 14 fixedly secured to the frame 10; a driving roller or drum 15 mounted in the frame; an endless belt 16 mounted on the drums 11 and 15; a hopper 17 mounted on the frame and positioned to discharge the material to be projected onto the belt 16; an idle, hollow, spool shaped roller or drum 18 mounted for rotation on a fixed shaft 19 extending between the upper ends of a pair of bell crank levers 20, each pivotally connected to one end of the shaft 12 and having its other end resiliently connected to the frame by a coil spring 21.

The frame or housing 10 may be of any suitable construction and is shown as being of a generally rectangular shape having a top wall 22, side walls 23, and end walls 24. The housing is provided with a suitable opening 25 through which the material is projected.

The roller or drum 15 is fixedly attached to a shaft 26 suitably journalled in the side walls of the frame 10 and driven by any suitable means, such as a belt driven pulley 27.

The hollow idle roller or drum 11 is loosely mounted on the shaft 12 for rotation thereon. The shaft 12 is rotatably mounted in bearing blocks 13 which, in turn, are slidably mounted in the slide 14 suitably fixedly attached to the side walls of the frame or housing 10.

The idle spool shaped roller or drum 18 is loosely mounted on the fixed shaft 19, the ends of which are secured to the upper ends of the pair of bell crank levers 20. Each of the bell crank levers 20 is keyed on one end of the shaft 12 for rotation therewith and its lower end is attached to a coil spring 21 fixedly secured to the end of the frame 10.

The lateral distance between the axis of rotation of the two drums 11 and 15 may be adjusted in any suitable manner, in this particular embodiment of the invention, as illustrated, this is accomplished as by means of a screw 28 fitted with a hand wheel 29. The screw 28 extends through a nut 30 fixedly secured to the end wall of the frame 10 and has its inner end connected to a [ shaped yoke or brace 31, the ends of which are connected to the bearing blocks 13. Thus, by turning the hand wheel 29, the bearing blocks 13 will be slidably moved in the slide 14, thereby altering the distance between the axis of rotation of the two drums 11 and 15.

The hopper 17 is suitably mounted on the frame or housing 10 in position to discharge the solid loose material onto the endless belt 16, while it is rotating about the drums 11 and 15 at high speed, so that the material will pass under the idle spool shaped drum 18 and be projected perpendicularly to the longitudinal axis of the drums.

The operation of the device is apparent.

The material to be projected is fed through hopper 17 onto the upper surface of the upper reach of the endless belt 16 while it is rotating at high speed around the drums 11 and 15, passes under the spool-shaped drum 18 and is projected perpendicularly to the longitudinal axis of the drum. The distance and height of projection of the material vary with the belt speed and the projection angle $\alpha$ (see Fig. 1) of the top reach of the endless belt. This angle of projection may be controlled by deflecting the projecting side of the belt through pressing upon it at a selected point by means of the spool shaped drum 18 and by altering the distance between the drums 11 and 15. This is accomplished by means of the hand wheel 29 operating the screw 28 to move the drum 11 toward or from the drum 15. When the distance between the drums 11 and 15 varies, the endless belt 16 slackens more or less. The spool-shaped drum 18 pressing upon a predetermined spot on the upper reach of the endless belt controls the deflection angle of the top reach of the belt and tensions the belt by means of the coil springs 21. Thus, the apparatus may be adjusted so that the projected material will follow a predetermined trajectory.

Figure 3:
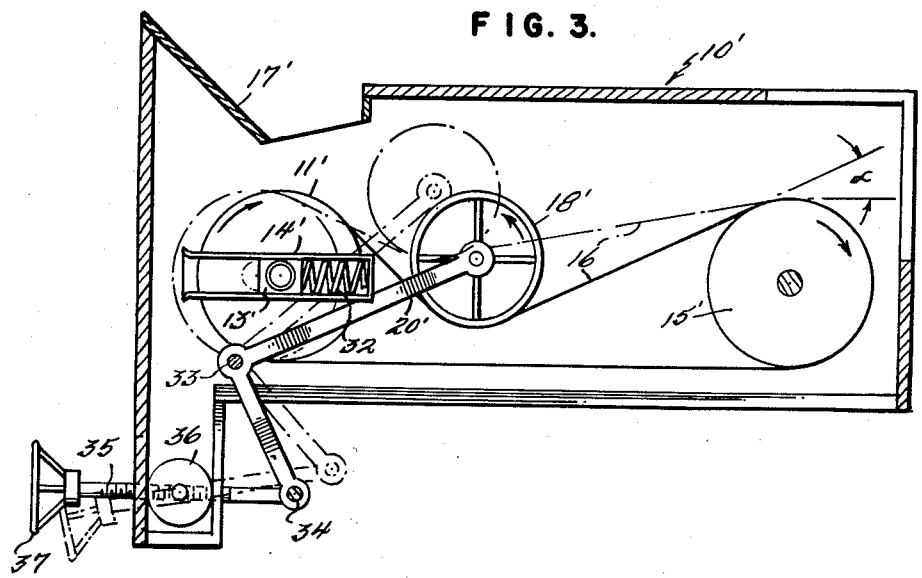
Figs. 3 and 4 are views similar to the views shown in Figs. 1 and 2, but showing a modified form of apparatus.
Figure 4:
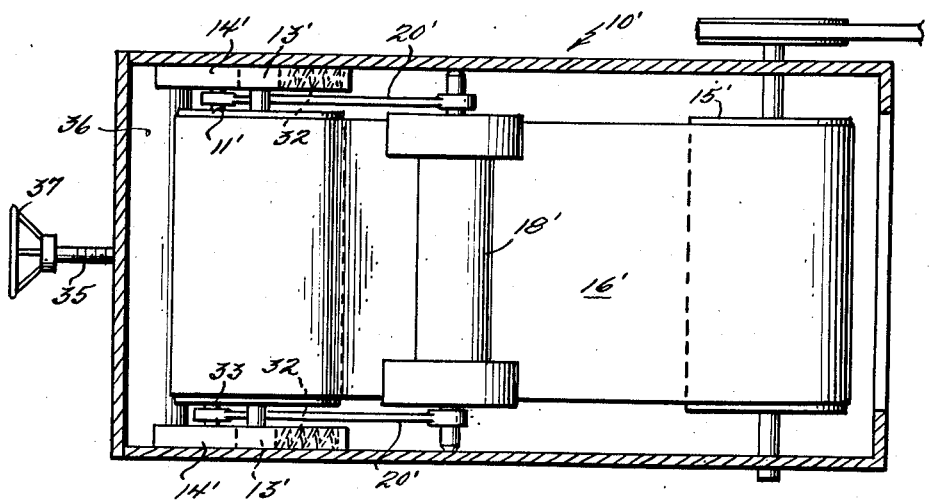

In Figs. 3 and 4, there is shown a modified form of apparatus constructed in accordance with the present invention.

In this particular modification, the slidable bearing blocks 13' are slidably mounted in slide guides 14' and are resiliently pressed toward the inner end wall of the frame 10', as by coil springs 32 mounted with the slide guides 14' between the bearing blocks 13' and the inner end walls of the guides.

The bell crank levers 20' which support the hollow spool shaped idle drum or roller 18', are keyed on shaft 33 suitably journalled in the side walls of the frame 10'. The lower ends of the bell crank levers 20' are pivotally connected to a rod 34 which extends therebetween. The movement of the bell crank levers 20' is effected as by means of a screw 35 which is screw threaded through a cylindrical member 36 rotatably mounted between the side walls of the frame 10' with its inner end connected to the rod 34. The outer end of the screw 35 is provided with a hand wheel 37 for rotating the screw.

The operation of the apparatus of this modification is apparent.

The material to be projected is fed through hopper 17' onto the endless belt 16' while it is rotating at high speed around the drums 11' and 15', pass under the spool shaped drum 18' and is projected perpendicularly to the longitudinal axis of the drums.

The angle of projection α' is controlled by deflecting the projecting side of the belt through pressing upon it at a selected point by means of the spool shaped drum 18' and by altering the distance between the drums 11' and 15'. This is accomplished by means of the hand wheel 37 operating the screw 35 to move, by means of the bell crank levers, the drum 18' toward or from the upper reach of the belt. The coil springs 32 pressing outwardly upon the bearing blocks 13' keep the endless belt permanently tensioned.

Figure 5:
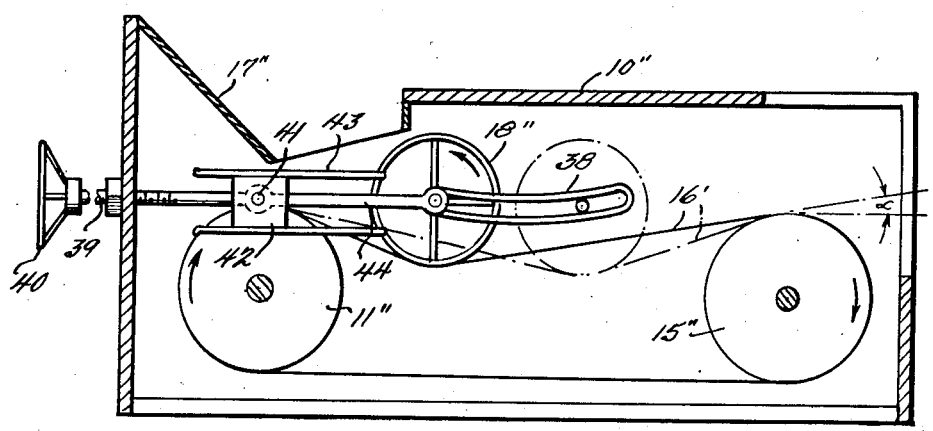
Figs. 5 and 6 are views similar to the views shown in Figs. 1 and 2, but showing another modified form of the apparatus.
Figure 6:
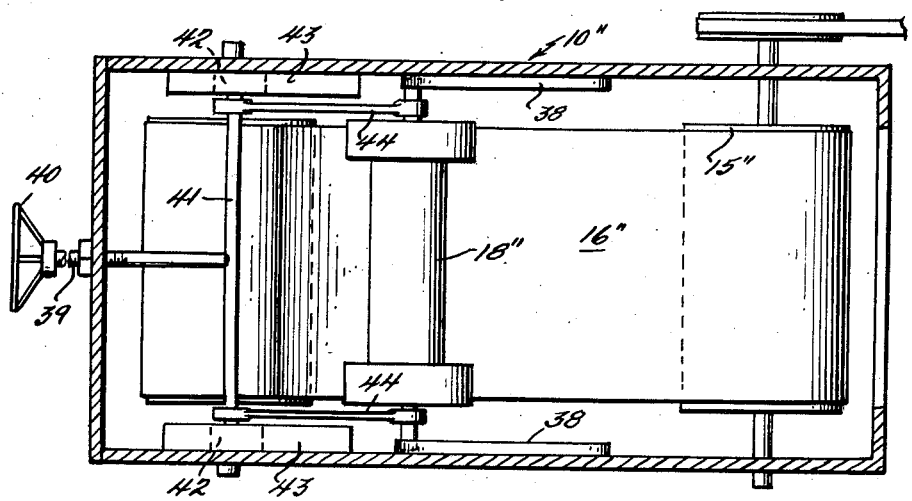

In Figs. 5 and 6, there is shown another modification of apparatus constructed in accordance with the present invention. In this particular modification, the hollow, spool shaped idle roller or drum 18" rests through the intermediary of its shaft 19" in slides 38, suitably fixedly mounted on the side walls of the frame 10". The slides have an accurate predetermined curvature. The movement of the shaft 19" in the slides 38 is accomplished as by means of a screw 39, fitted with a hand wheel 40. The screw is threaded through a nut fixed to one end of the frame and its inner end is connected to a cross bar 41, the inner ends of which are connected to slide bearing blocks 42, each slidably mounted in a slide guide 43 fixedly secured to the side walls of the frame 10". The bearing blocks 42 are each pivotally connected to one end of the shaft 19" by means of levers 44.

The operation of the apparatus of this modification is apparent.

The material to be projected is fed through hopper 17" onto the endless belt 16" while it is rotating at high speed around the drums 11" and 15", passes under the spool shaped drum 18", and is projected perpendicularly to the longitudinal axis of the drums. The angle of projection α" is controlled by deflecting the projecting side or reach of the belt through pressing upon it at a selected point by means of the spool shaped drum 18". This is accomplished by means of the hand wheel 40 operating the screw 39 to move the shaft 19" toward or from the drum 15". The amount of deflection of the top reach of the endless belt is determined by the curvature of the guide members 38, the lateral distance between the axis of rotation of the drums 11" and 15" remains unaltered.

From the foregoing, it readily will be seen that there has been provided novel and improved apparatus for projecting solid loose material through various distances and to various heights, such apparatus being simple and rugged in construction and efficient in operation, apparatus in which the angle of projection is varied by adjusting the deflection angle of the projecting belt while the rest of the apparatus is unchanged, thereby permitting the use of the apparatus in very low and dipping mine levels.

Obviously, the invention is not restricted to the various embodiments thereof herein shown and the described, but may be used in various combinations and sub-combinations.

What is claimed is:

1. Apparatus for projecting loose material comprising an endless belt mounted on a pair of laterally spaced rotatable drums, one of which is laterally adjustable relative to the other; means for feeding the material to be projected onto the upper surface of the upper reach of said belt; means for rapidly moving said belt about said drums at a predetermined rate of speed whereby the material will be projected in a direction generally perpendicularly to the longitudinal axis of the drum on the projection side of the apparatus; and adjustable deflecting means for deflecting the upper reach of said belt a predetermined amount to produce a predetermined angle of projection of the material from said belt so that the projected material will follow a predetermined trajectory, said adjustable deflecting means including a rotatable spool-shaped roller member extending transversely of and engaging the upper reach of said belt and displaceable toward and from the horizontal plane passing through the axis of said drums and adjustable means for controlling the amount of the displacement of said spool-shaped roller member.

2. Apparatus for projecting loose material comprising a generally rectangular supporting frame having end and side walls; a pair of laterally spaced rotatable drums carried by said frame and extending between the side walls thereof with one of said drums being laterally adjustable relative to the other; an endless belt wound about said drums; a hopper carried by said frame and positioned to feed the material to be projected onto the upper surface of the upper reach of said endless belt; means for rapidly rotating said endless belt about said drums at a predetermined rate of speed whereby the material will be projected in a direction generally perpendicularly to the longitudinal axis of the drum on the projection side of the apparatus; and adjustable deflecting means for deflecting the upper reach of said belt a predetermined amount to produce a predetermined angle of projection of the material from said belt so that the projected material will follow a predetermined trajectory, said adjustable deflecting means including a rotatable spool-shaped roller member extending transversely of and engaging the upper reach of said belt and displaceable toward and from the horizontal plane passing through the axis of said drums and adjustable means for controlling the amount of the displacement of said spool-shaped roller member.

3. Apparatus as set forth in claim 2, wherein one of said drums is fixedly attached to a shaft extending transversely of said frame and wherein said means for rotating said belt are connected to drive said shaft, and wherein the other of said drums is loosely mounted for rotation about a rotatable shaft journalled in bearing blocks slidably and adjustably mounted in opposed guide members fixedly secured to the side walls of said frame whereby the lateral distance between the two drums may be adjusted.

4. Apparatus as set forth in claim 3, wherein said rotatable roller member for deflecting the upper reach of the endless belt is loosely mounted on a shaft extending between and secured to a pair of bell crank levers for pivotal movement toward and from said upper reach of said endless belt.

5. Apparatus as set forth in claim 4, wherein said bell crank levers are pivotally mounted on the rotatable shaft carrying the laterally adjustable drum and wherein spring means are connected to said bell crank levers for normally urging said roller member toward the upper reach of the endless belt.

References Cited in the file of this patent

UNITED STATES PATENTS

| 2,467,634 | Sinden | Apr. 19, 1949 |

FOREIGN PATENTS

| 290,793 | Germany | Mar. 16, 1916 |
| 1,033,127 | France | Apr. 1, 1953 |